United States Patent
Ho et al.

(10) Patent No.: US 6,816,535 B2
(45) Date of Patent: Nov. 9, 2004

(54) CO-ALIGNMENT OF TIME-MULTIPLEXED PULSED LASER BEAMS TO A SINGLE REFERENCE POINT

(75) Inventors: James G. Ho, Los Angeles, CA (US); James H. Poylio, Torrance, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 232 days.

(21) Appl. No.: 10/244,966

(22) Filed: Sep. 17, 2002

(65) Prior Publication Data

US 2004/0056010 A1 Mar. 25, 2004

(51) Int. Cl.[7] .............................................. H01S 3/08
(52) U.S. Cl. ........................... 372/107; 372/20; 372/21; 372/22; 372/23
(58) Field of Search ........................... 372/107, 22, 21, 372/23

(56) References Cited

U.S. PATENT DOCUMENTS

| | | | |
|---|---|---|---|
| 4,140,398 A | * 2/1979 | Hodder | 356/139.05 |
| 4,144,505 A | * 3/1979 | Angelbeck et al. | 372/107 |
| 4,146,329 A | 3/1979 | King et al. | |
| 4,571,712 A | * 2/1986 | Romano et al. | 369/44.33 |
| 4,626,649 A | 12/1986 | Dupeyrat et al. | |
| 4,724,298 A | 2/1988 | Hawkins et al. | |
| 4,847,479 A | 7/1989 | Clark et al. | |
| 4,855,564 A | 8/1989 | Hawkins et al. | |
| 4,941,082 A | 7/1990 | Pailthorp et al. | |
| 4,982,078 A | 1/1991 | Ekstrand | |
| 5,513,000 A | 4/1996 | Smith et al. | |
| 5,847,861 A | * 12/1998 | Kafka et al. | 359/330 |

FOREIGN PATENT DOCUMENTS

| | | |
|---|---|---|
| EP | 0 287 032 A | 10/1988 |
| EP | 1 134 548 A | 9/2001 |

OTHER PUBLICATIONS

Hoose, "Alignment System Devices for Medium Repitition Rate Glass Fusion Lasers", SPIE vol. 251 Optical Alignment (1980).

* cited by examiner

Primary Examiner—Don Wong
Assistant Examiner—Dung Nguyen
(74) Attorney, Agent, or Firm—Katten Muchin Zavis Rosenman; John S. Paniaguas

(57) ABSTRACT

An alignment system for co-aligning multiple laser beams to a single spatial reference point in real time. The alignment system includes a beam sampler for sampling the multiple pulsed laser beams. The sampled laser beams are directed onto a quadrant photo detector or quad cell. The output signals from the quad cell are directed to a detector signal integration circuit which develops error signals for driving tip-tilt mirrors in the beam path of the multiple lasers. The system includes a gate, reset and pulse ID generator for generating pulse trigger signals for each of the multiple lasers and signals for correlating the detector signals with the laser that produced the signal. Accordingly, a system is provided for a time multiplexed, multiple laser system which automatically co-aligns the output beams from each of the lasers to a single spatial reference point in real time.

9 Claims, 3 Drawing Sheets

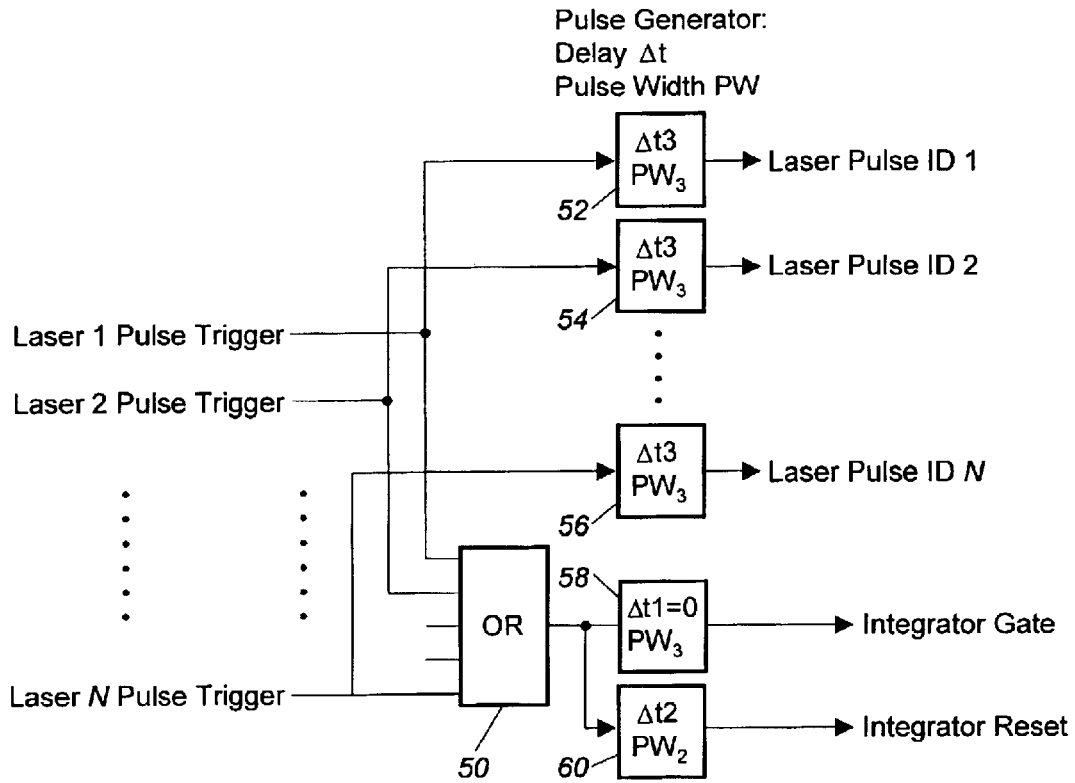
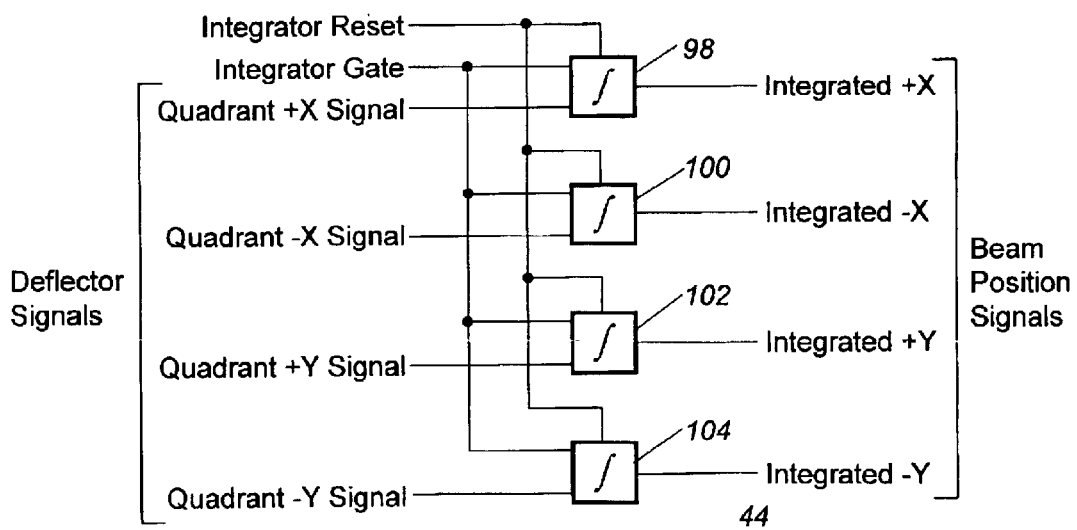

CO-ALIGNMENT OF TIME-MULTIPLEXED PULSED LASER BEAMS TO A SINGLE REFERENCE POINT

BACKGROUND OF THE INVENTION

1. Field of the Invention

The present invention relates to an alignment system for lasers and more particularly to a alignment system for co-aligning multiple time-multiplexed pulsed laser beams to a single reference point in real time.

2. Description of the Prior Art

Alignment systems for aligning the output beams of lasers are generally known in the art. Examples of such alignment systems are disclosed in U.S Pat. Nos. 4,146,329; 4,626,649; 4,724,298; 4,855,564; 4,982,078; and 4,941,082, hereby incorporated by reference. Such alignment systems normally sample the laser beam in order to develop an error signal. The error signal is used to drive, for example, an alignment mirror, disposed in the optical path of the laser for correcting the spatial position of the laser beam. Various methods are known for developing an error signal. For example, U.S. Pat. No. 4,982,078 utilizes a quadrant detector. The quadrant detector is disposed in the beam path. The signals from the quadrant detector are used to develop error signals.

Systems are also known for aligning laser systems which utilize a plurality of lasers. For example, commonly owned U.S. Pat. No. 4,847,479 discloses an optical communication system which utilizes multiple laser output beam, which are wavelength multiplexed by way of a diffraction grating. In order to compensate for wavelength drift and mechanical alignment drift, the '479 patent discloses an auto-alignment system. In particular, the system samples the output beam and utilizes a quadrant detector for detecting the mechanical alignment drift in the lasers. Although each laser beam is identifiable by its wavelength, the wavelength may be too close in frequency to permit the use of filtering to identify the beams. As such, a tracer signal is generated for each laser beam. A tracer signal may be formed by superimposing low frequency sine waves on each laser beam. Either different frequencies may be used for the tracer frequencies for each laser beam or the same frequency used at pre-selected times in a time multiplexed manner.

Laser systems are also known in which pulsed laser output beams are time multiplexed and directed to a single spatial reference point. There are no known alignment systems for aligning laser pulses from multiple lasers and co-aligning such pulses to a signal spatial target in real time. Thus, there exists a need for an alignment system for co-alignment of multiple time multiplexed pulsed laser beams directed to a single spatial target in real time.

BRIEF SUMMARY OF THE INVENTION

The present invention relates to an alignment system for co-aligning multiple laser beams to a single spatial reference point in real time. The alignment system includes a beam sampler for sampling the multiple pulsed laser beams. The sampled laser beams are directed onto a quadrant photodetector or quad cell. The output signals from the quad cell are directed to a detector signal integration circuit which develops error signals for driving tip-tilt mirrors in the beam path of the multiple lasers. The system includes a gate, reset and pulse ID generator for generating pulse trigger signals for each of the multiple lasers and signals for correlating the detector signals with the laser that produced the signal. Accordingly, a system is provided for a time multiplexed multiple laser system which automatically co-aligns the output beams from each of the lasers to a single spatial reference point in real time.

DESCRIPTION OF THE DRAWINGS

These and other advantages of the present invention will be readily understood with reference to following specification and attached drawings wherein:

FIG. 2 is a block diagram of the gate, reset and pulse ID generator which forms a portion of the present invention.

FIG. 3 is a block diagram of the detector signal integration circuit in accordance with the present invention.

DETAILED DESCRIPTION

The present invention relates to an automatic alignment system for use with multiple lasers which generate either pulsed or continuous wave laser beams and are directed at a single target and operated in a time multiplexed manner. The alignment system is adapted to be used with N-lasers. An important aspect of the invention is that each of the N-lasers is independently controlled which allows the co-alignment of the remaining beams even though any number of the lasers may be switched on and off line.

Figure 1:
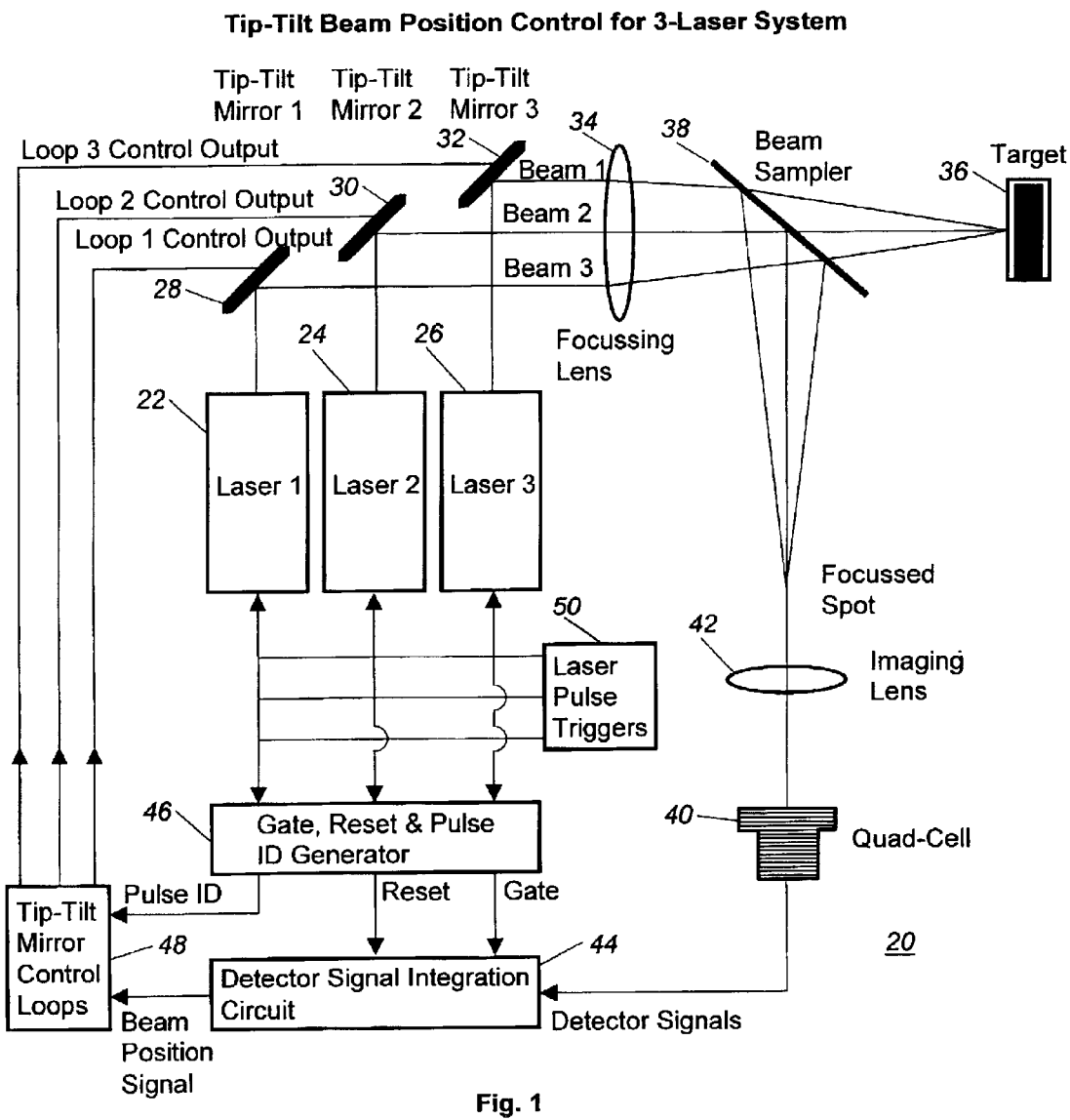
FIG. 1 is a block diagram of the auto alignment system in accordance with the present invention.

An exemplary system for providing automatic alignment of three lasers directed at a single target is illustrated in FIG. 1 and generally identified with the reference numeral 20. As shown in FIG. 1, the alignment system 20 is utilized with an exemplary number of three lasers 22, 24 and 26 for simplicity. The laser 22, 24 and 26 may be, for example, Gain switched, Q-switched, or Mode-locked lasers. Any pulsed laser may be controlled by this beam co-alignment system. Tip-tilt mirrors 28, 30, and 32 are disposed in the beam path of each of the lasers 22, 24 and 26, respectively. The tip-tilt mirrors 28, 30 and 32 redirect the laser beams to a focusing lens 34. The focusing lens 34 converges the laser beams from the lasers 22, 24 and 26 onto a single reference point or target 36. The beams from the lasers 22, 24 and 26 are sampled by a beam sampler 38, disposed in the beam path between the focusing lens 34 and the target 36. The sampled beams are imaged on a quadrant photo detector or quad cell 40 by way of an imaging lens 42. As is known in the art, a quad cell is a photodetector that provides an electrical signal as a function of the position of the beam spot relative to the four quadrants of the quad cell. The output of the quad cell 40, identified as Detector Signals is applied to a detector signal integration circuit 44. Since the lasers 22, 24 and 26 are time multiplexed, only one detector signal from one of the lasers 22, 24 and 26 will be applied to the detector signal and integration circuit 44 at a time. As will be discussed in more detail below, the detector signal integration circuit 44 is controlled by the gate, reset and pulse ID generator 46. The Gate and Reset signals control detector signal integration, while the pulse ID identifies which laser of 22, 24, and 26 generated the detector signals which were applied to the detector signal integration circuit 44. The output of the detector signal integration circuit 44 is a beam position or error signal, which is applied to a tip-tilt mirror control loop circuit 48. The tip-tilt mirror control loop circuit 48 generates signals that are applied to the tip-tilt mirrors 28, 30, and 32 to adjust the positions of the beams from the lasers 22, 24, and 26. The tip-tilt mirror control loop (48) can utilize many generic feedback control algorithms that generate compensating control signals from error signals. Electrically, the control system can be either digital or analog. Through the use of pulse ID, the error signal for each laser is directed to the corresponding control loop. Each loop can operate independently and asynchronously.

Many different type of algorithms will work. An example of such an algorithm is proportional-integral different (PID) control.

This forms a closed loop system. The beam position or error signals are used as feedback. The system functions to null the error signal such that the beams from the lasers 22, 24, and 26 are co-aligned.

The lasers 22, 24, and 26 are controlled by a laser pulse trigger circuit 50. The laser pulse trigger circuit 50 generates a pulse trigger signal which is applied to each of the lasers 22, 24, and 26, causing the lasers 22, 24, 26 to generate pulsed output beams. The laser pulse trigger signal is an electrical signal that precedes the laser optical pulse. In this case, the purpose of the signal is to start the quad detector integration process, and capture only the electrical signal generated by the optical pulse, not by ambient light or by pulses from another laser.

For an actively Q-switched laser, the signal can be the trigger signal for the Q-switch Pockels cell or the acousto-optic modulator. In the case of a gain switched laser, the electrical trigger of the pump source (diodes or flash lamp) may be used.

The laser pulse trigger signals are additionally applied to the gate, reset and pulse ID generator 46 to generate control signals for the detector signal integration circuit 44 as well as laser pulse ID signals for correlating the laser output pulses with a particular laser.

The gate, reset and pulse ID generator 46 is illustrated in detailed in FIG. 2. As shown, pulse trigger signals from each of the lasers 22, 24 and 26 are applied to an OR gate 50 as well as a plurality of pulse generators 52, 54, and 56. The output of the OR gate 50 is also applied to a pair of pulse generator 58 and 60, used to generate an Integrator Gate and Integrator Reset signals, used to control the detector signal integration circuit 44 as will be discussed in more detail below.

Figure 4:
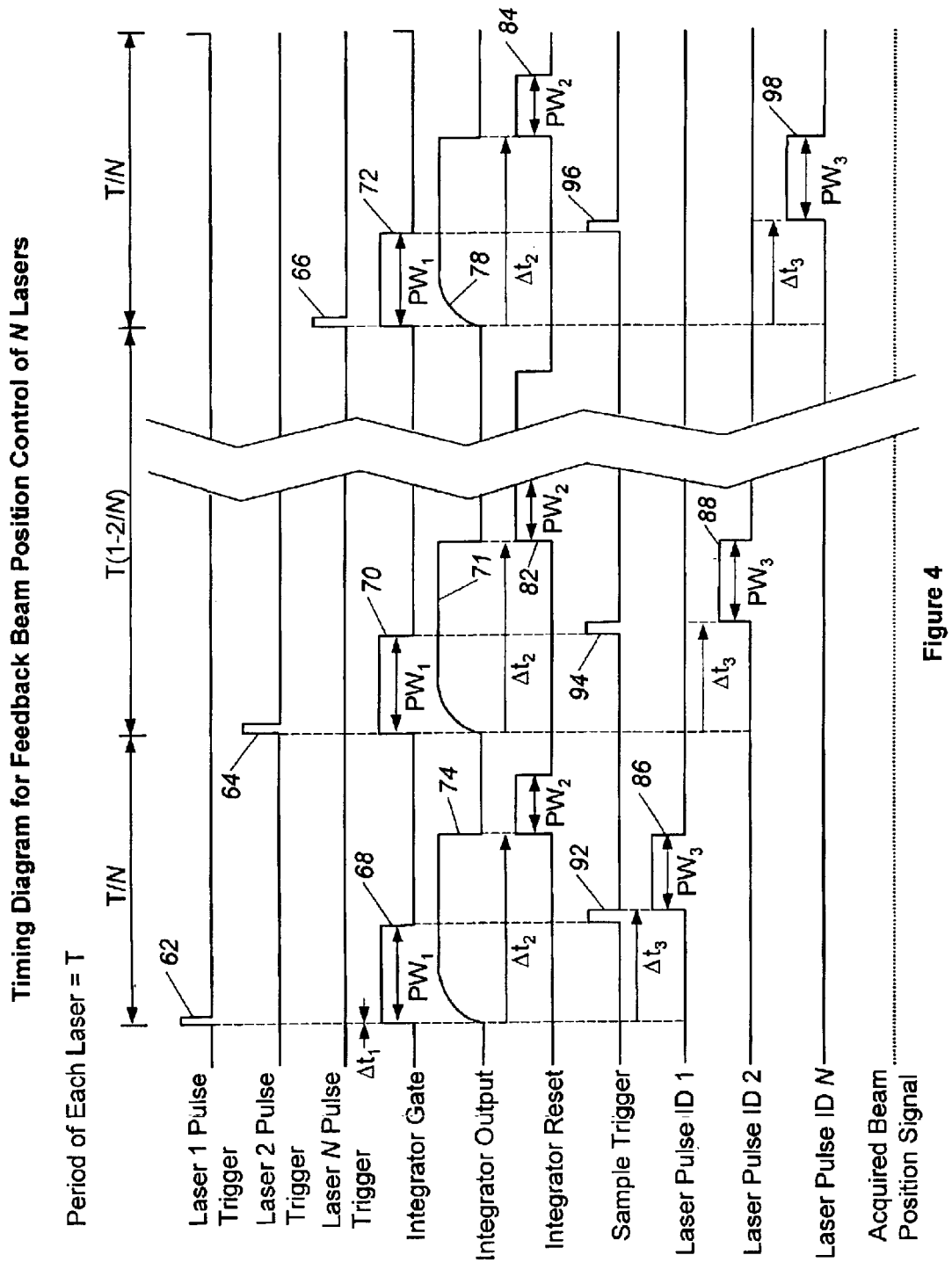
FIG. 4 is a timing diagram for the position control system in accordance with the present invention.

The operation of the gate, reset and pulse ID generator 46 is best understood with reference to a timing diagram illustrated in FIG. 4. With reference to FIG. 4, the pulse trigger signals for the lasers 22, 24 and 26 are pulses identified with the reference numerals 62, 64 and 66. In a time-multiplexed system, the firing of lasers 22, 24 and 26 and thus the pulses 62, 64 and 66 are temporally spaced by T/N, where T is the period for each laser and N is the number of lasers. Thus, assuming that the pulse trigger signal 62 occurs at time t=0, the pulse trigger signal for the next time multiplexed laser 24 will occur at a time t=T/N. The last pulse trigger signal 66 will be spaced from the preceding pulse trigger signal 64 also by a time of T/N.

As mentioned above, each of the pulse trigger signals 62, 64 and 66 is applied to the OR gate 50 (FIG. 3). These pulse trigger signals 62, 64 and 66 are used to generate an Integrator Gate signal as well as an Integrator Reset signal. Referring to FIG. 4, the Integrator Gate signal, generated by the pulse generator 58, is initiated, for example, on the leading edge of the pulse trigger signals 62, 64 and 66. The pulse width of the Integrator Gate signal may be selected as $PW_1$. As such, three Integrator Gate signals 68, 70 and 72 are generated by the pulse generator 58 in (FIG. 2) response to the pulse trigger signals 62, 64 and 66. The Integrator Gate signals 68, 70 and 72 are used to enable the integration period of the integrators forming the detector signal integration circuit 54. More particularly, as will be discussed in more detail below, the detector signal integration circuit 44 includes a plurality of integrators; one integrator corresponding to each of the lasers 22, 24 and 26. Integrator Reset signals are generated after a certain delay, $\Delta t_2$ from the laser pulse trigger, and identified with the reference numerals 80, 82 and 84. The Integrator Reset signals 80, 82 and 84 are generated by the pulse generator 60 (FIG. 2) after a delay $\Delta t_2$ from the laser pulse trigger and may be selected to have a pulse with equal to $PW_2$. As will be discussed in more detail below, the Integrator Reset signal resets the integrators of the detector signal integration circuit 44.

In order to correlate the detector signal applied to the detector signal integration circuit with the appropriate laser, the gate, reset and pulse ID generator 46 also generates laser pulse ID signals for each of the lasers 22, 24 and 26. These pulse ID signals are generated by the pulse generators 52, 54 and 56 (FIG. 2). Referring to FIG. 4 the pulse ID signals are pulses identified with the reference numeral 86, 88 and 90. These pulse ID signals 86, 88 and 90 may be generated after delay $\Delta t_3$ relative to the pulse trigger signal 62, 64 and 66. These pulse ID signals, as shown in FIG. 4, are high when the samples are taken and integrated by the detector signal integration circuit 44 to enable the beam position signal at the output of the detector signal integration circuit 44 to be correlated with a laser 22, 24 or 26.

The pulse generators, 52, 54, 56, 58 and 60 may be implemented in either hardware or software or a combination of the two to produce the signals in the timing diagram illustrated in FIG. 4. All such embodiments are of the ordinary skill in the art and are within the scope of the present invention.

The detector signal integration circuit 44 is illustrated in FIG. 3. The detector signal integration circuit 44 includes 4 integrators 98, 100, 102 and 104. Each of the integrators 98, 100, 102 and 104 receives an output signal of one quadrant of the quad cell 40. More particularly the Quadrant +X signals are applied to the integrator 98, while the Quadrant −X signals are applied to the integrator 100. Similarly, the Quadrant +Y signals are applied to be integrated 102, while the Quadrant −Y signals applied to the integrator 104. As discussed above, the Integrator Gate signal initiates integration of the integrators 98, 100, 102 and 104 for a period of, for example, $PW_1$ as illustrated in FIG. 4. The integrator output signals are identified in FIG. 3 as Integrated +X, Integrated −X, Integrated +Y and Integrated −Y and are used to form beam position or error signals. These signals are applied to the tip-tilt mirror control loop 48 to adjust the tip-tilt mirrors 28, 30 and 32. The pulse ID signals 86, 88 and 90 (FIG. 3) are also applied to the tip-tilt mirror control loop 48 in order to correlate the beam position signals with one of the lasers 22, 24 and 26. The outputs of the tip-tilt mirror control loop are correction signals which are applied to the tip-tilt mirrors 28, 30 and 32. These error signals drive the tip-tilt mirrors 28, 30 and 32 to null out the error, bringing the output beams from the lasers 22, 24 and 26 into co-alignment. Optically, the laser beam becomes co-aligned with the combination of the focusing lens and the quad detector. As shown in FIG. 1, the 3 laser beams are directed toward the focusing lens (element 34) in a parallel fashion, not overlapping. In other words, the 3 beams' cross-section at the focusing lens do not spatially overlap each other. This is important because each laser beam has a finite cross-sectional size, and the finite size of each tip-tilt mirror prevents beam super-position at the focusing lens. However, physical law dictates that the 3 beams will come to a true overlapping spot at the location of the focal point (and only at the focal point) if the beams are parallel with respect to each other, hence co-alignment. The focusing lens effectively generates a spatial Fourier transform of the laser beams at the focal point location, and the beam pointing (directional) information is translated into position information. Thus, a beam position detecting device, like the quad-cell, can obtain laser beam pointing information by measuring the position of the beam at the focal spot.

The beam sampler (element 38) takes a small fraction of the main beam, and creates an equivalent focal point at another location, and the image of the focal spot is relayed onto the quad-cell by the imaging lens (element 42) with desired magnification factor. This is often the case where the focal spot size is too small for the quad-cell to achieve desired resolution.

If the laser beam is centered on the quad-cell, all 4 cells will generate the same amount of electrical signal, and the error signal is zero. If the beam deviates from the center of the quad-cell, different signal strength will result from the 4 cells. The control system then processes the 4 signals by analog or digital means, and determines the amount of beam deviation and generates error signals for the X and Y directions. The error signal is used to generate a control signal by whatever algorithm chosen by the design. The control signal is an electrical signal that is sent to the tip-tilt mirror mount, which turns the mirror in the X and Y direction proportional to the signal. Turning of the tip-tilt mirror causes the pointing direction (not the position) of the laser beam to change. The change of beam pointing is again detected by the quad-cell at the focal point, thus completing the control loop. The tip-tilt mirror can be fabricated from many different technologies.

Obviously, many modifications and variations of the present invention are possible in light of the above. Thus, it is to be understood that, within the scope of the appended claims, the invention may be practiced otherwise than as specifically described above.

What is claimed and desired to be covered by a Letters Patent is as follows:

1. An alignment system for multiple time multiplexed lasers each under the control of pulse trigger signals, the alignment system comprising:

a beam sampler for sampling the output beams of the multiple lasers;

a quad cell photodetector, having four quadrant output signals disposed in the beam path of the beam sampler for generating detector signals as a function of the spatial location of the sampled output beams;

an error signal circuit for receiving the detector signals and generating beam position signals;

means for correlating the error signals with one of the multiple lasers; and a plurality of tip-tilt mirrors, one tip-tilt mirror disposed in the beam path of each of the multiple lasers, each tip-tilt mirror responsive to the respective error signals for adjusting the beam position of each laser.

2. The alignment system as recited in claim 1, wherein the error signal circuit includes four integrators, one integrator coupled to each of the four quadrant output signals.

3. The alignment system as recited in claim 1, wherein the correlating means includes means for generating an Integrator Gate and an Integrator Reset signal for controlling the integrators.

4. The alignment system as recited in claim 3, wherein the generating means includes means for generating Integrator Gate signal at a predetermined time, $\Delta t$, after each pulse trigger signal.

5. The alignment system as recited in claim 4, wherein the generating means includes means for generating the Integrator Reset signal at a predetermined time $\Delta t_2$ after each pulse trigger.

6. The alignment system as recited in claim 1, wherein the correlating means includes means for generating pulse ID signals for each of the multiple lasers.

7. The alignment system as recited in claim 6, wherein the pulse ID signals are generated at a predetermined time $\Delta t_3$ after the leading edge of the laser pulse trigger.

8. The alignment system as recited in claim 6, wherein the pulse ID signal is high output corresponding to each pulse trigger signal.

9. The alignment system as recited in claim 8, wherein the generating means includes means for generating sample trigger signals relative to the integrator gate signals, wherein the pulse ID signals are generated as a function of the sample trigger signals corresponding to the laser pulse trigger signals.

* * * * *